(12) United States Patent
Sung et al.

(10) Patent No.: US 11,332,660 B2
(45) Date of Patent: May 17, 2022

(54) COMPOUND, COLOR CONVERSION COMPOSITION AND COLOR CONVERSION FILM COMPRISING SAME, BACK LIGHT UNIT COMPRISING SAME, DISPLAY DEVICE COMPRISING SAME, AND METHOD FOR MANUFACTURING COLOR CONVERSION FILM

(71) Applicant: LG CHEM, LTD., Seoul (KR)

(72) Inventors: Jiyeon Sung, Daejeon (KR); Hoyong Lee, Daejeon (KR); Seungha Kim, Daejeon (KR); Wonjoon Heo, Daejeon (KR); Duy Hieu Le, Daejeon (KR); Sang Pil Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 57 days.

(21) Appl. No.: 16/965,936

(22) PCT Filed: Oct. 15, 2019

(86) PCT No.: PCT/KR2019/013489
§ 371 (c)(1),
(2) Date: Jul. 29, 2020

(87) PCT Pub. No.: WO2020/080785
PCT Pub. Date: Apr. 23, 2020

(65) Prior Publication Data
US 2021/0108133 A1    Apr. 15, 2021

(30) Foreign Application Priority Data

Oct. 15, 2018  (KR) .................. 10-2018-0122398

(51) Int. Cl.
*C07F 5/02*  (2006.01)
*C09K 9/02*  (2006.01)
(Continued)

(52) U.S. Cl.
CPC .................. *C09K 9/02* (2013.01); *C07F 5/02* (2013.01); *G02B 5/23* (2013.01); *G02F 1/133514* (2013.01)

(58) Field of Classification Search
CPC .. C09K 9/02; C09K 11/06; G02B 5/23; C07F 5/02; C07F 5/022; C08K 5/55; G02F 1/133514
See application file for complete search history.

(56) References Cited

U.S. PATENT DOCUMENTS

| 6,337,536 B1 | 1/2002 | Matsubara et al. |
| 6,805,978 B2 | 10/2004 | Murase et al. |

(Continued)

FOREIGN PATENT DOCUMENTS

| CN | 102993763 A | 3/2013 |
| CN | 106543213 A | 3/2017 |

(Continued)

OTHER PUBLICATIONS

Rohand, et al., "Photophysics of 3,5-diphenoxy substituted BODIPY dyes in solution" Photochem. Photobiol. Sci., 2007, 6, 1061-1066.
(Continued)

*Primary Examiner* — Bijan Ahvazi
(74) *Attorney, Agent, or Firm* — Rothwell, Figg, Ernst & Manbeck, P.C.

(57) ABSTRACT

The present specification relates to a compound having structure openness for a boron atom of 0.5 or less, a color conversion composition and a color conversion film comprising same, a backlight unit comprising same, a display apparatus comprising same, and a method for manufacturing a color conversion film.

13 Claims, 1 Drawing Sheet

(51) Int. Cl.
  *C09K 11/06* (2006.01)
  *G02B 5/23* (2006.01)
  *G02F 1/1335* (2006.01)

(56) References Cited

U.S. PATENT DOCUMENTS

| | | |
|---|---|---|
| 7,897,786 B2 | 3/2011 | Ulrich et al. |
| 11,149,196 B2 | 10/2021 | Ishihashi et al. |
| 2003/0082406 A1 | 5/2003 | Murase et al. |
| 2010/0264406 A1 | 10/2010 | Nagao et al. |
| 2016/0223162 A1 | 8/2016 | Shin et al. |
| 2017/0260212 A1 | 9/2017 | Lee et al. |
| 2017/0349822 A1* | 12/2017 | Lee .............. G02F 1/1335 |
| 2018/0004041 A1 | 1/2018 | Shin et al. |
| 2018/0186817 A1 | 7/2018 | Lee et al. |
| 2019/0263836 A1 | 8/2019 | Oh et al. |
| 2021/0347790 A1 | 11/2021 | Sung et al. |

FOREIGN PATENT DOCUMENTS

| | | |
|---|---|---|
| JP | 2003-012676 A | 1/2003 |
| JP | 2008-530063 A | 8/2008 |
| JP | 2011-241160 A | 12/2011 |
| JP | 2021-531319 A | 11/2021 |
| KR | 10-2000-0011622 A | 2/2000 |
| KR | 10-2010-0092472 A | 8/2010 |
| KR | 10-1590299 B1 | 2/2016 |
| KR | 10-2016-0080063 A | 7/2016 |
| KR | 10-2017-0008432 A | 1/2017 |
| KR | 10-2017-0037488 A | 4/2017 |
| KR | 10-2017-0037491 A | 4/2017 |
| KR | 10-2017-0037500 A | 4/2017 |
| KR | 10-2017-0049360 A | 5/2017 |
| KR | 10-2018-0013798 A | 2/2018 |
| KR | 10-2018-0026340 A | 3/2018 |
| WO | 2016-190283 A1 | 12/2016 |
| WO | 2018-044120 A1 | 3/2018 |

OTHER PUBLICATIONS

Zhao et al., "Stepwise Polychlorination of 8-chloro-BODIPY and Regioselective Functionalization of 2,3,5,6,8-pentachloro-BODIPY" The Journal of Organic Chemistry, 2015, vol. 80, Issue 16, 8377-8383.

Khan, et al., "Synthesis and Properties of Covalently Linked Trichromophore Systems" Eur. J. Org. Chem. 2011, 7011-7022.

Jiao et al., "Regioselective Stepwise Bromination of Boron Dipyrromethene (BODIPY) Dyes" J. Org. Chem. 2011, 76, 9988-9996.

Gong et al., "Fast and Selective Two-Stage Ratiometric Fluorescent Probes for Imaging of Glutathione in Living Cells", Anal. Chem. 2017, 89, 13112-13119.

Wu et al., "Synthesis, structure and photophysical properties of dibenzofuran-fused boron dipyrromethenes" J. Porphyrins Phthalocyanines, 2018; 22: 1-10.

International Search Report and Written Opinion issued for International Application No. PCT/KR2019/013489 dated Jan. 29, 2020, 5 pages.

Zhao, N. et al., "Synthesis of 3,8-Dichloro-6-ethyl-1,2,5,7-tetramethyl—BODIPY from an Asymmetric Dipyrroketone and Reactivity Studies at the 3,5,8-Positions", Chem. Eur. J., 2015, 21, 6181-6192.

\* cited by examiner

[FIG. 1]
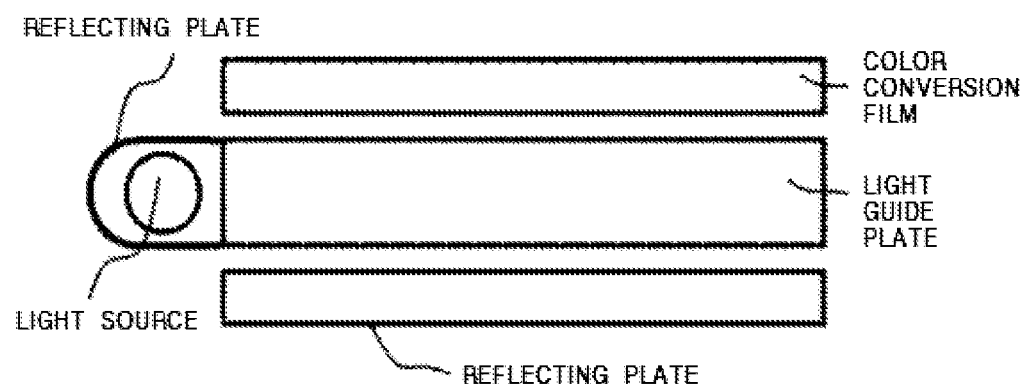
[FIG. 2]
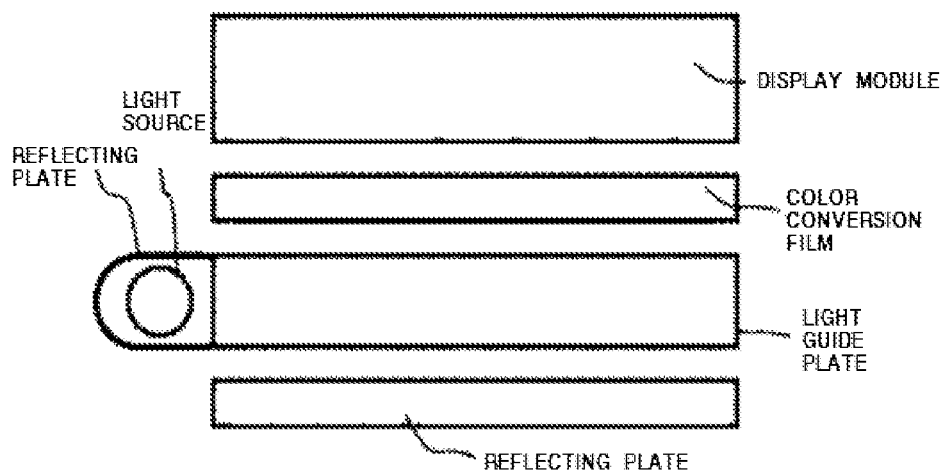

COMPOUND, COLOR CONVERSION COMPOSITION AND COLOR CONVERSION FILM COMPRISING SAME, BACK LIGHT UNIT COMPRISING SAME, DISPLAY DEVICE COMPRISING SAME, AND METHOD FOR MANUFACTURING COLOR CONVERSION FILM

This application is a 35 U.S.C. 371 National Phase Entry Application from PCT/KR2019/013489 filed on Oct. 15, 2019, designating the United States, which claims priority to and the benefits of Korean Patent Application No. 10-2018-0122398, filed with the Korean Intellectual Property Office on Oct. 15, 2018, the entire contents of which are incorporated herein by reference.

TECHNICAL FIELD

The present specification relates to a compound, a color conversion composition and a color conversion film including the same, a backlight unit including the same, a display apparatus including the same, and a method for manufacturing a color conversion film.

BACKGROUND OF THE INVENTION

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes is difficult.

BRIEF DESCRIPTION OF THE INVENTION

The present specification is directed to providing a compound, a color conversion composition and a color conversion film including the same, a backlight unit including the same, a display apparatus including the same, and a method for manufacturing a color conversion film.

One embodiment of the present specification provides a compound having structure openness for a boron atom of 0.5 or less.

Another embodiment of the present specification provides a color conversion composition including the compound.

Another embodiment of the present specification provides a color conversion film including a resin matrix; and a compound having structure openness for a boron atom of 0.5 or less dispersed into the resin matrix.

Another embodiment of the present specification provides a backlight unit including the color conversion film.

Another embodiment of the present specification provides a display apparatus including the backlight unit.

Another embodiment of the present specification provides a method for manufacturing a color conversion film, the method including measuring structure openness of compounds including a boron atom; selecting a compound having the structure openness of or less; dissolving the compound selected in the selecting of a compound in an organic solvent; coating the solution on a substrate; and drying the solution coated on the substrate.

Advantageous Effects

A compound according to one embodiment of the present specification is, as well as having high fluorescence efficiency, stable for water or oxygen, and has lower unit costs of production compared to quantum dots. Accordingly, by using a compound described in the present specification as a fluorescent substance of a color conversion film, a color conversion film having excellent luminance and color gamut, having a simple manufacturing process, and having low manufacturing costs can be provided.

BRIEF DESCRIPTION OF DRAWINGS

FIG. 1 is a mimetic diagram using a color conversion film according to one embodiment of the present specification in a backlight unit.

FIG. 2 is a mimetic diagram illustrating a structure of a display apparatus according to one embodiment of the present specification.

DETAILED DESCRIPTION OF THE INVENTION

Hereinafter, the present application will be described in more detail.

One embodiment of the present specification provides a compound having structure openness for a boron atom of 0.5 or less.

Structure openness for a boron atom according to the present specification indicates possibility of a boron atom site being in contact with the outside, and is a value quantitatively analyzing changes in the steric effect resulting from chemical properties of a material.

Structure openness according to the present specification may be calculated through an analysis method described in Korean Patent Application Laid-Open Publication No. 10-2017-0008432. Specifically, the method for analyzing structure openness includes (1) gathering information on a position and a van der waals radius for each constituting atom of a material; (2) establishing a structure of the material by setting the van der waals radius at the position of the each constituting atom as a radius of a sphere of the each constituting atom; and (3) measuring an area in contact with a spherical probe at a specific atomic site in the material, and the structure openness is calculated through a method of analyzing spatial properties for a specific atomic site in the material, which identifies the tendency of changing a contact area with the specific atomic site by changing the radius of the spherical probe.

The structure openness according to the present specification is measured using a probe having a radius of 1.6 Å.

As for the structure openness according to the present specification, 1) structure optimization is conducted on the compound according to the present specification for each constituting atom using a density functional theory (DFT). Then, van der waals radius data for each of the atoms are collected. 2) Using the coordinates for the constituting atoms of the compound obtained in the structure optimization and the van der waals radius, data for the sphere-based structure are stored in a PDB file form, and the data are input into an area calculating program of Materials Studio, a commercial program calculating a surface area, and stored. 3) Then, the probe radius is set at 1.6 Å, and a Connolly surface area of boron is calculated using an area calculating program of Materials Studio, a commercial program.

The structure openness according to the present specification being greater than 0 and less than or equal to 0.5 considers an access range of a 1.6 Å probe close to 1.46 Å, a covalent diameter length of oxygen, and is effective in simulating degradation caused by oxygen approach.

According to one embodiment of the present specification, the structure openness for a boron atom may be greater than 0 and less than or equal to 0.4.

According to one embodiment of the present specification, the structure openness for a boron atom may be greater than 0.01 and less than or equal to 0.2.

According to one embodiment of the present specification, the structure openness for a boron atom may be greater than 0.01 and less than or equal to 0.1.

In the present specification, the compound having structure openness for a boron atom of 0.5 or less is a compound including boron.

In the present specification, a core of the compound having structure openness for a boron atom of 0.5 or less has a boron-dipyrromethene ("BODIPY") structure.

In the present specification, a core of the compound having structure openness for a boron atom of 0.5 or less may have the following BODIPY structure.

In the present specification, the compound having structure openness for a boron atom of 0.5 or less may be represented by the following General Formula 1.

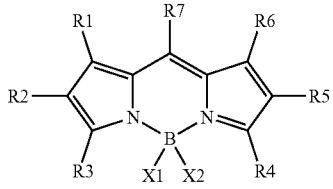

[General Formula 1]

In the present specification, X1, X2, and R1 to R7 in General Formula 1 are not limited as long as they are a monovalent substituent, and the structure openness may be controlled by selecting the substituents.

In General Formula 1, X1, X2, and R1 to R7 may be illustrated as below, however, even for compounds having the following substituents, the structure openness value may vary depending on the interrelation of each of the substituents.

In General Formula 1, R1 and R6 are the same as or different from each other, and each independently hydrogen; deuterium; a substituted or unsubstituted alkyl group; a substituted or unsubstituted cycloalkyl group; a substituted or unsubstituted aryl group; or a substituted or unsubstituted heteroaryl group, R2 and R5 are the same as or different from each other, and each independently hydrogen; deuterium; a halogen group; a nitrile group; an ester group; an imide group; a substituted or unsubstituted cycloalkyl group; a substituted or unsubstituted aryl group; or a substituted or unsubstituted heteroaryl group, R3 and R4 are the same as or different from each other, and each independently a substituted or unsubstituted alkyl group; a substituted or unsubstituted cycloalkyl group; a substituted or unsubstituted aryl group; a substituted or unsubstituted heteroaryl group; a substituted or unsubstituted aryloxy group; or a substituted or unsubstituted arylthioxy group, R7 is a substituted or unsubstituted aryl group; a substituted or unsubstituted heteroaryl group; a substituted or unsubstituted aryloxy group; or a substituted or unsubstituted arylthioxy group, and X1 and X2 are the same as or different from each other, and each independently a halogen group; a nitrile group; an ester group; a substituted or unsubstituted alkoxy group; or a substituted or unsubstituted alkynyl group.

In the present specification, X1 and X2 are F.

In the present specification, R1 to R7 are the same as or different from each other, and each independently hydrogen, deuterium, a halogen group, a cyano group, a substituted or unsubstituted alkyl group, a substituted or unsubstituted cycloalkyl group, a substituted or unsubstituted aryl group, a substituted or unsubstituted alkoxy group, a substituted or unsubstituted aryloxy group, a substituted or unsubstituted arylthioxy group, a substituted or unsubstituted heteroaryl group, or —C(=O)OR8, and R8 is a substituted or unsubstituted aryl group.

In the present specification, R2 and R5 are the same as or different from each other, and each independently hydrogen, Cl, a substituted or unsubstituted cycloalkyl group, a substituted or unsubstituted aryl group, or C(=O)OR8, and R8 is a substituted or unsubstituted aryl group.

In the present specification, R2 and R5 are the same as or different from each other, and each independently hydrogen; Cl; a cycloalkyl group unsubstituted or substituted with an alkyl group; an aryl group unsubstituted or substituted with a fluoroalkyl group or an alkoxy group; or C(=O)OR8, and R8 is a substituted or unsubstituted aryl group.

In the present specification, R3 and R4 are the same as or different from each other, and each independently a substituted or unsubstituted heterocyclic group; or a substituted or unsubstituted aryloxy group.

In the present specification, R3 and R4 are the same as or different from each other, and each independently a substituted or unsubstituted heterocyclic group including 0 or S; or a substituted or unsubstituted aryloxy group.

In the present specification, R3 and R4 are the same as or different from each other, and each independently a heterocyclic group including 0 or S; or an aryloxy group unsubstituted or substituted with an alkyl group, an aryl group, a cyano group, a halogen group or a haloalkyl group.

In the present specification, R3 and R4 are the same as or different from each other, and each independently a heterocyclic group including 0 or S; or an aryloxy group unsubstituted or substituted with an alkyl group, an aryl group, a cyano group, a halogen group or a fluoroalkyl group.

In the present specification, R3 and R4 are the same as or different from each other, and each independently a dibenzofuran group; a dibenzothiophene group; or a phenoxy group unsubstituted or substituted with one, two or more substituents selected from the group consisting of an alkyl group having 1 to 4 carbon atoms, a phenyl group, a cyano group, F and —CF3.

In the present specification, R1 and R6 are the same as or different from each other, and each independently hydrogen; a substituted or unsubstituted aryl group; a substituted or unsubstituted cycloalkyl group; a substituted or unsubstituted alkyl group; or a substituted or unsubstituted heteroaryl group.

In the present specification, R1 and R6 are the same as or different from each other, and each independently hydrogen; an aryl group unsubstituted or substituted with an alkyl group, a fluoroalkyl group, an aryloxy group or a cyano group; a cycloalkyl group unsubstituted or substituted with an alkyl group, a fluoroalkyl group, an aryloxy group or a cyano group; an alkyl group; or a heteroaryl group.

In the present specification, R1 and R6 are the same as or different from each other, and each independently hydrogen; a phenyl group unsubstituted or substituted with an alkyl group having 1 to 4 carbon atoms, a trifluoromethyl group, a methoxy group or a cyano group; a cyclohexyl group unsubstituted or substituted with a methyl group; an alkyl group having 1 to 4 carbon atoms; a benzothiophene group; a benzofuran group; or a pyridine group.

In the present specification, R7 is a substituted or unsubstituted arylthioxy group; a substituted or unsubstituted aryloxy group; a substituted or unsubstituted heteroaryl group; or a substituted or unsubstituted aryl group.

In the present specification, R7 is an arylthioxy group unsubstituted or substituted with an alkyl group, a cyano group, a halogen group or an alkoxy group; an aryloxy group unsubstituted or substituted with an alkyl group, a cyano group, a halogen group or an alkoxy group; a heteroaryl group unsubstituted or substituted with an alkyl group, a cyano group, a halogen group or an alkoxy group; or an aryl group unsubstituted or substituted with an alkyl group, a cyano group, a halogen group or an alkoxy group.

In the present specification, R7 is an arylthioxy group unsubstituted or substituted with an alkyl group having 1 to 4 carbon atoms, a cyano group, F or a methoxy group; an aryloxy group unsubstituted or substituted with an alkyl group having 1 to 4 carbon atoms, a cyano group, F or a methoxy group; a heteroaryl group unsubstituted or substituted with an alkyl group having 1 to 4 carbon atoms, a cyano group, F or a methoxy group; or an aryl group unsubstituted or substituted with an alkyl group having 1 to 4 carbon atoms, a cyano group, F or a methoxy group.

In the present specification, the compound having structure openness for a boron atom of 0.5 or less may be selected from among the following structural formulae.

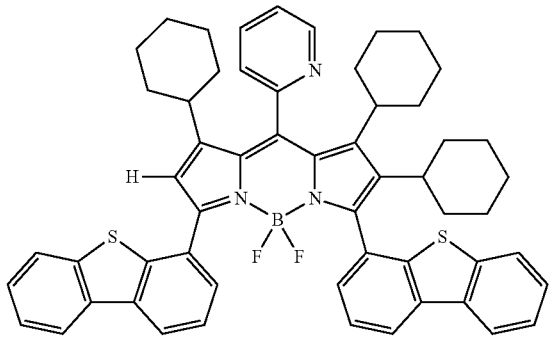

B

-continued

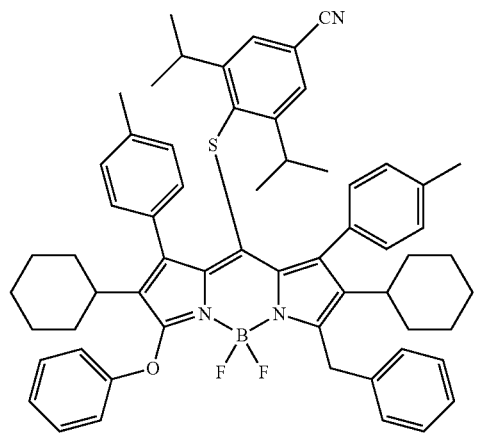

C

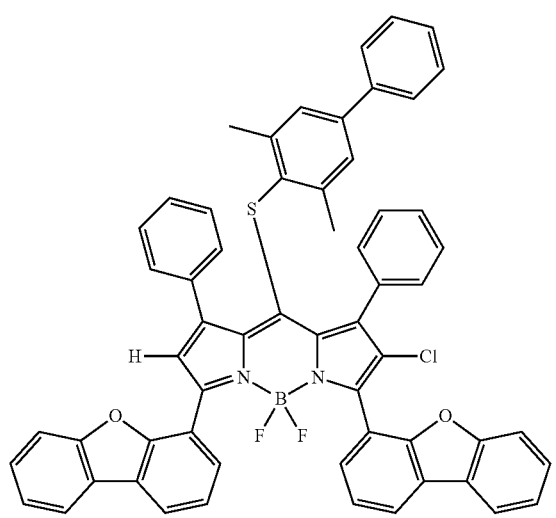

A

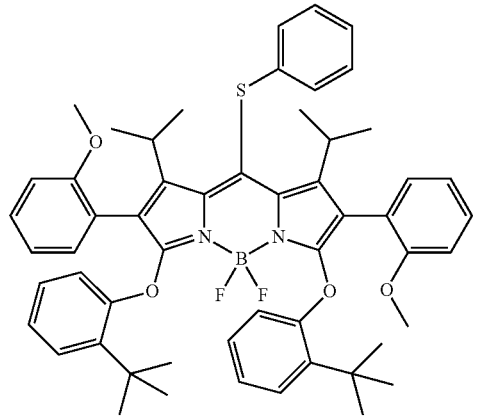

D

E
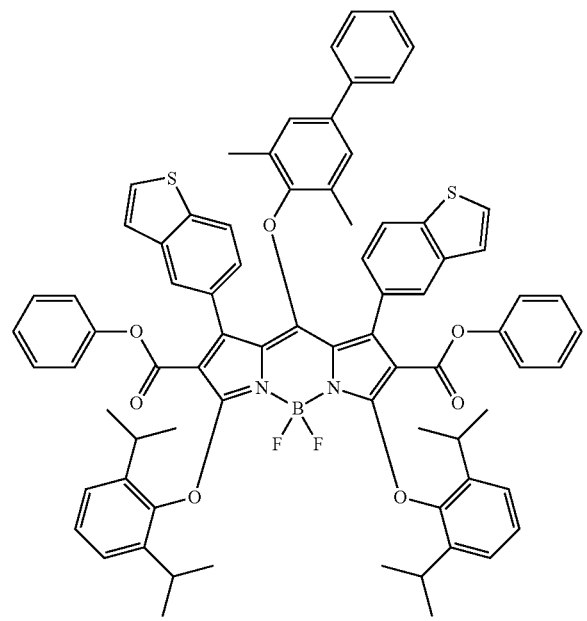
F
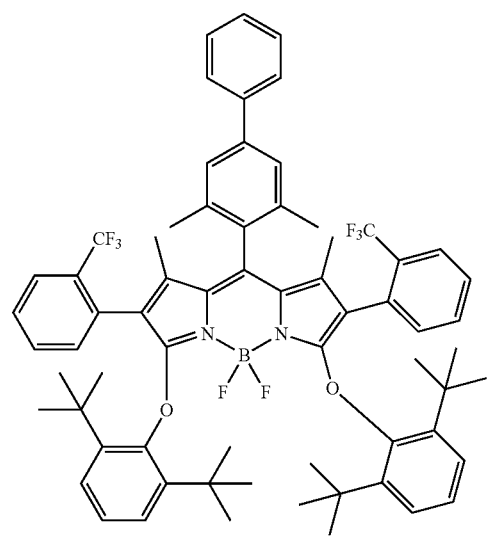
G
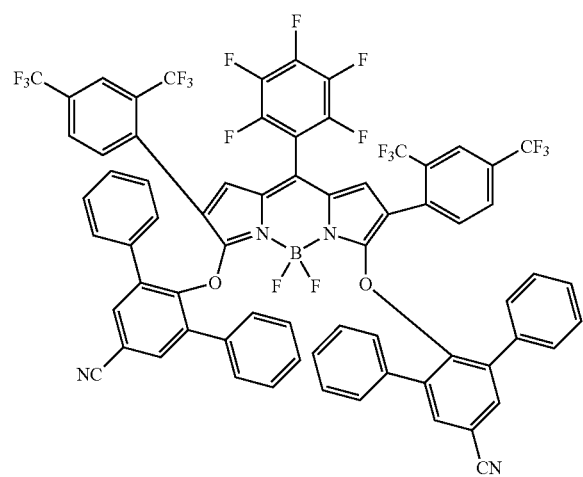
H
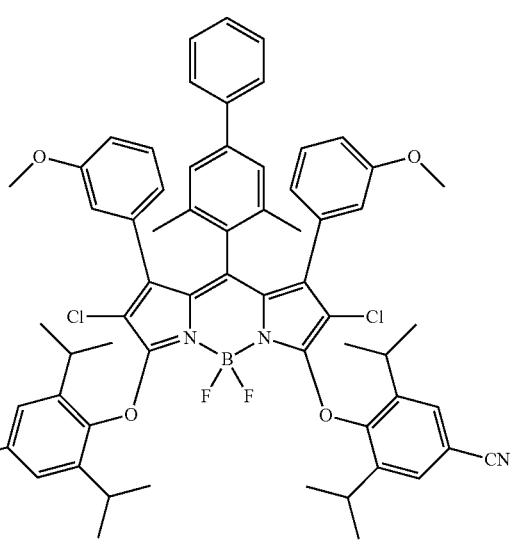
I
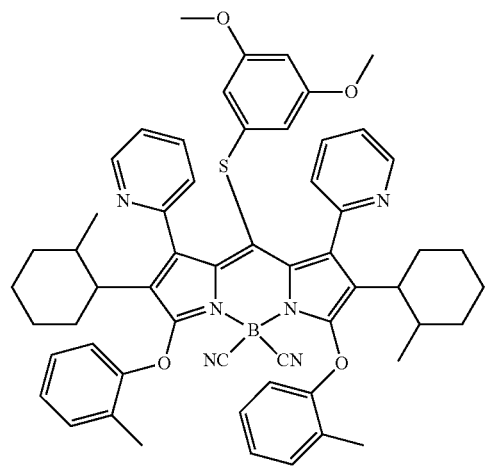
J
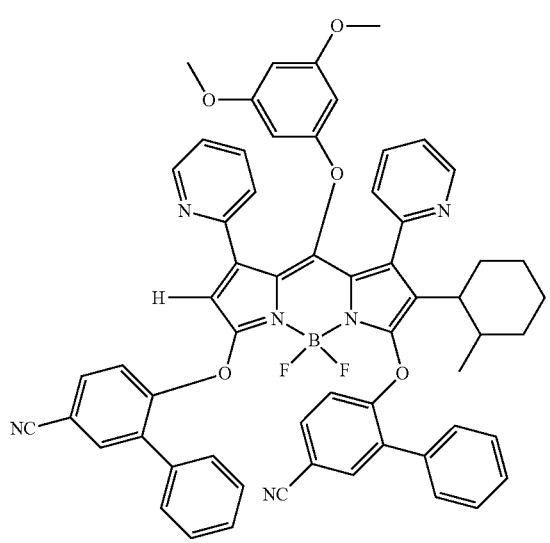

K

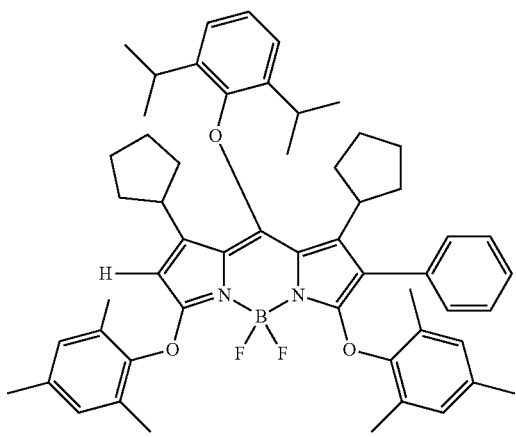

L

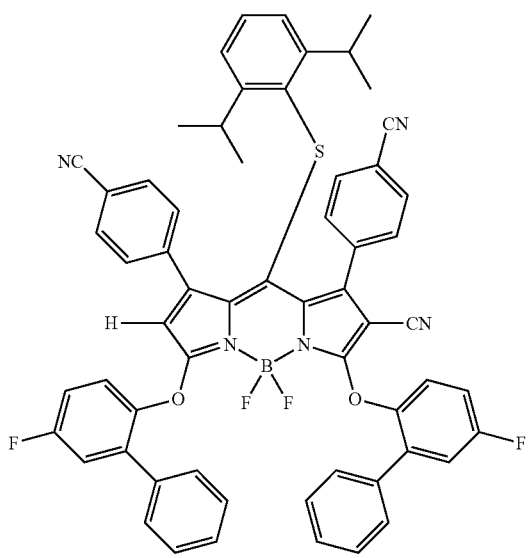

M

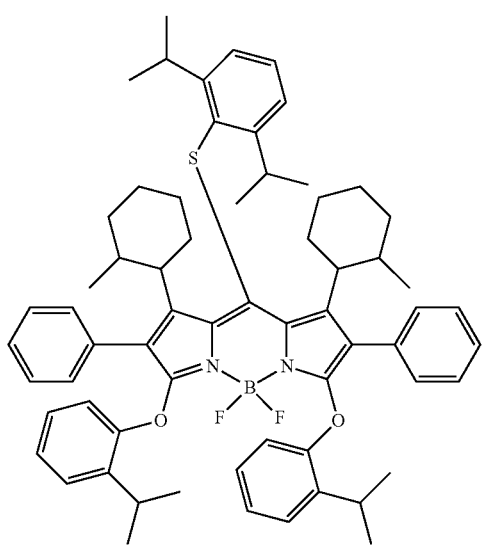

N

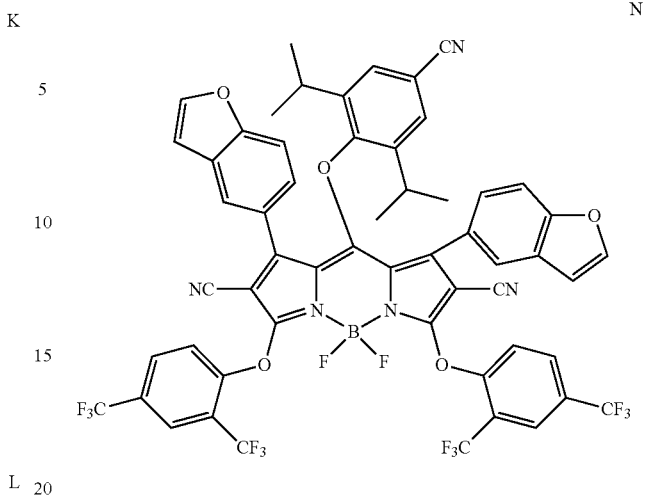

In the present specification, a certain part "including" certain constituents means capable of further including other constituents, and does not exclude other constituents unless particularly stated on the contrary.

In the present specification, one member being placed "on" another member includes not only a case of the one member being in contact with the another member but a case of still another member being present between the two members.

Examples of substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of hydrogen; deuterium; a halogen group; a nitrile group; a nitro group; a carbonyl group; an imide group; an amide group; an ester group; a hydroxyl group; an amine group; a haloalkyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted alkynyl group; a substituted or unsubstituted aryl group; a substituted or unsubstituted alkylthioxy group; a substituted or unsubstituted arylthioxy group; a substituted or unsubstituted alkylsulfoxy group; and a substituted or unsubstituted heteroaryl group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification, examples of the halogen group may include fluorine, chlorine, bromine or iodine.

In the present specification, the alkyl group may be linear or branched, and although not particularly limited thereto, the number of carbon atoms is preferably from 1 to 30.

Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethyl butyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the haloalkyl group represents the same alkyl group as defined in the present disclosure in which the hydrogen atom of the alkyl group is replaced by the same or a different halogen group. The haloalkyl group may be linear or branched, and although not particularly limited thereto, the number of carbon atoms is preferably from 1 to 10. Specific examples thereof may include —$CH_2Cl$, —$CF_3$, —$CH_2CF_3$, —$CF_2CF_3$ and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, an "adjacent" group may mean a substituent substituting an atom directly linked to an atom substituted by the corresponding substituent, a substituent sterically most closely positioned to the corresponding substituent, or another substituent substituting an atom substituted by the corresponding substituent. For example, two substituents substituting ortho positions in a benzene ring, and two substituents substituting the same carbon in an aliphatic ring may be interpreted as groups "adjacent" to each other.

In the present specification, the meaning of "adjacent groups bond to each other to form a ring" among substituents means adjacent groups bonding to each other to form a substituted or unsubstituted hydrocarbon ring; or a substituted or unsubstituted heteroring.

In the present specification, the aryl group in the aryloxy group, the arylthioxy group, the arylsulfoxy group, the N-arylalkylamine group and the N-arylheteroarylamine group is the same as the examples of the aryl group described above. Specific examples of the aryloxy group may include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, specific examples of the arylthioxy group may include a phenylthioxy group, a 2-methylphenylthioxy group, a 4-tert-butylphenylthioxy group and the like, and specific examples of the arylsulfoxy group may include a benzenesulfoxy group, a p-toluenesulfoxy group and the like, however, the aryloxy group, the arylthioxy group and the arylsulfoxy group are not limited thereto.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or polycyclic. Examples of the heteroaryl group may include a thiophene group, a furanyl group, a pyrrole group, an imidazolyl group, a thiazolyl group, an oxazolyl group, an oxadiazolyl group, a pyridine group, a bipyridine group, a pyrimidine group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, an isoxazolyl group, a thiadiazolyl group, a phenothiazinyl group, a dibenzofuranyl group and the like, but are not limited thereto.

One embodiment of the present specification provides a color conversion composition including the compound.

According to one embodiment of the present specification, the color conversion composition includes a resin matrix, and the compound is dispersed into the resin matrix.

According to one embodiment of the present specification, the compound is included in 0.001% by weight to 20% by weight with respect to 100 parts by weight of the color conversion composition.

According to one embodiment of the present specification, the color conversion composition has viscosity of 200 cps to 2,000 cps.

According to one embodiment of the present specification, the color conversion composition has viscosity of 150 cps to 500 cps.

One embodiment of the present specification provides a color conversion film including a resin matrix; and a compound having structure openness for a boron atom of 0.5 or less dispersed into the resin matrix.

The content of the compound having structure openness for a boron atom of 0.5 or less in the color conversion film may be in a range of 0.001% by weight to 10% by weight.

The color conversion film may include one type of the compound having structure openness for a boron atom of 0.5 or less, or may include two or more types thereof. For example, the color conversion film may include one type of compound emitting green light among the compounds having structure openness for a boron atom of 0.5 or less. As another example, the color conversion film may include one type of compound emitting red light among the compounds having structure openness for a boron atom of 0.5 or less. As another example, the color conversion film may include one type of compound emitting green light and one type of compound emitting red light among the compounds having structure openness for a boron atom of 0.5 or less.

The color conversion film may further include additional fluorescent substances in addition to the compound having structure openness for a boron atom of 0.5 or less. When using a light source emitting blue light, the color conversion film preferably includes both a green light emitting fluorescent substance and a red light emitting fluorescent substance. In addition, when using a light source emitting blue light and green light, the color conversion film may only include a red light emitting fluorescent substance. However, the color conversion film is not limited thereto, and even when using a light source emitting blue light, the color conversion film may only include a red light emitting compound when a separate film including a green light emitting fluorescent substance is laminated. On the other hand, even when using a light source emitting blue light, the color conversion film may only include a green light emitting compound when a separate film including a red light emitting fluorescent substance is laminated.

The color conversion film may further include an additional layer including a resin matrix; and a compound dispersed into the resin matrix and emitting light in a wavelength different from the wavelength of the compound having structure openness for a boron atom of 0.5 or less. The compound emitting light in a wavelength different from the wavelength of the compound having structure openness for a boron atom of 0.5 or less may also be the compound having structure openness for a boron atom of 0.5 or less, or may be other known fluorescent substances.

The resin matrix material is preferably a thermoplastic polymer or a thermocurable polymer. Specifically, a poly (meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include $TiO_2$, silica, borosilicate, alumina, sapphire, air or other gases, air- or gas-filled hollow beads or particles (for example, air/gas-filled glass or polymers); or polymer particles including polystyrene, polycarbonate, polymethyl methacrylate, acryl, methyl methacrylate, styrene, melamine resin, formaldehyde resin, melamine and formaldehyde resins, or any suitable combination thereof.

The light diffusing particles may have particle diameters in a range of 0.1 micrometers to 5 micrometers, for example, in a range of 0.3 micrometers to 1 micrometer. The content of the light diffusing particles may be determined as necessary, and for example, may be in a range of approximately 1 part by weight to 30 parts by weight based on 100 parts by weight of the resin matrix.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or higher. For example, a PET film may be used as the substrate.

The color conversion film described above may be prepared by coating a resin solution in which the compound having structure openness for a boron atom of 0.5 or less described above is dissolved on a substrate and drying the result, or by extruding and filming the compound having structure openness for a boron atom of 0.5 or less described above together with a resin.

The compound having structure openness for a boron atom of 0.5 or less is dissolved in the resin solution, and therefore, the compound having structure openness for a boron atom of 0.5 or less is uniformly distributed in the solution. This is different from a quantum dot film preparation process that requires a separate dispersion process.

As for the resin solution in which the compound having structure openness for a boron atom of 0.5 or less is dissolved, the preparation method is not particularly limited as long as the compound having structure openness for a boron atom of 0.5 or less and the resin described above are dissolved in the solution.

According to one example, the resin solution in which the compound having structure openness for a boron atom of 0.5 or less is dissolved may be prepared using a method of preparing a first solution by dissolving the compound having structure openness for a boron atom of 0.5 or less in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving the compound having structure openness for a boron atom of 0.5 or less and a resin in a solvent, a method of dissolving the compound having structure openness for a boron atom of 0.5 or less in a solvent and subsequently adding and dissolving a resin, a method of dissolving a resin in a solvent and then subsequently adding and dissolving the compound having structure openness for a boron atom of 0.5 or less, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably have compatibility so as to be mixed with each other.

The process of coating the resin solution in which the compound having structure openness for a boron atom of 0.5 or less is dissolved on a substrate may use a roll-to-roll process. For example, a process of unwinding a substrate from a substrate-wound roll, coating the resin solution in which the compound having structure openness for a boron atom of 0.5 or less is dissolved on one surface of the substrate, drying the result, and then winding the result again on the roll may be used. When a roll-to-roll process is used, viscosity of the resin solution is preferably determined in a range capable of conducting the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is conducted. The drying process may be conducted under a condition required to remove a solvent. For example, a color conversion film including a fluorescent substance including the compound having structure openness for a boron atom of 0.5 or less having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be conducted prior to or at the same time as the drying.

When the compound having structure openness for a boron atom of 0.5 or less is filmed by being extruded with a resin, extrusion methods known in the art may be used, and for example, the color conversion film may be prepared by extruding the compound having structure openness for a boron atom of 0.5 or less with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

Another embodiment of the present specification provides a backlight unit including the color conversion film described above. The backlight unit may have backlight unit constitutions known in the art except for including the color conversion film. For example, FIG. 1 illustrates one example. According to FIG. 1, the color conversion film according to the embodiments described above is provided on a surface opposite to a surface facing a reflecting plate of a light guide plate. FIG. 1 illustrates a constitution including a light source and a reflecting plate surrounding the light source, however, the constitution is not limited to such a structure, and may vary depending on the backlight unit structure known in the art. In addition, as the light source, a direct type as well as a side chain type may be used, and the reflecting plate or the reflective layer may not be included or may be replaced with other constituents as necessary, and when necessary, additional films such as a light diffusing film, a light concentrating film and a luminance enhancing film may be further provided. Preferably, a light concentrating film and a luminance enhancing film are further provided on the color conversion film.

In the constitution of the backlight unit as in FIG. 1, a scattering pattern may be provided as necessary on the upper surface or a lower surface of the light guide plate. Light introduced into the light guide plate has non-uniform light distribution due to repetition of optical processes such as reflection, total reflection, refraction or transmission, and the scattering pattern may be used to induce the non-uniform light distribution to uniform brightness.

Another embodiment of the present application uses a display apparatus including the backlight unit described above. This display apparatus is not particularly limited as long as it includes the above-described backlight unit as a constituent. For example, the display apparatus includes a display module and a backlight unit. FIG. 2 illustrates a structure of the display apparatus. However, the structure is not limited thereto, and between the display module and the backlight unit, additional films such as a light diffusing film, a light concentrating film and a luminance enhancing film may be further provided as necessary.

One embodiment of the present specification provides a method for manufacturing a color conversion film, the method including measuring structure openness of compounds including a boron atom; selecting a compound having the structure openness of 0.5 or less; dissolving the compound selected in the selecting of a compound in an organic solvent; coating the solution on a substrate; and drying the solution coated on the substrate.

According to one embodiment of the present specification, the measuring of structure openness of compounds including a boron atom is calculating through the above-described method for analyzing structure openness.

According to one embodiment of the present specification, the method for manufacturing a color conversion film is measuring structure openness using a probe having a radius of 1.6 Å, and includes selecting a compound having openness of 0.5 or less.

According to one embodiment of the present specification, the method further includes dissolving a resin in a second organic solvent, and includes, after the dissolving of the compound in an organic solvent, mixing the compound-dissolved organic solvent and the second organic solvent.

According to one embodiment of the present specification, the solution in the coating of the solution on a substrate means a solution obtained by dissolving the selected compound in an organic solvent.

According to one embodiment of the present specification, the solution in the coating of the solution on a substrate means a solution obtained by mixing the compound-dissolved organic solvent and the second organic solvent.

EMBODIMENTS OF THE INVENTION

Hereinafter, the present specification will be described in detail with reference to examples. However, the examples according to the present specification may be modified to various other forms, and the scope of the present application is not to be construed as being limited to the examples described below. Examples of the present specification are provided in order to more fully describe the present specification to those having average knowledge in the art.

The compound having structure openness for a boron atom of 0.5 or less of the present specification may be synthesized through the following reaction formulae, and as long as it includes boron, the structure is not limited to the following BODIPY structure.

[Reaction Formula 1]

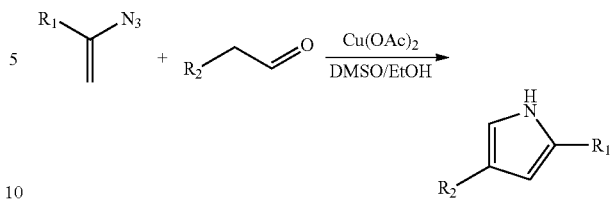

After introducing 1 equivalent of aldehyde and 1.5 equivalents of azide to a solvent, approximately 2% to 5% of a catalyst was introduced thereto, and the result was stirred while heating at 110° C. under argon. After the reaction was finished, the result was extracted using water and ethyl acetate, and water was removed using anhydrous magnesium sulfate. The result was concentrated through vacuum distillation, and then purified through a column.

[Reaction Formula 2]

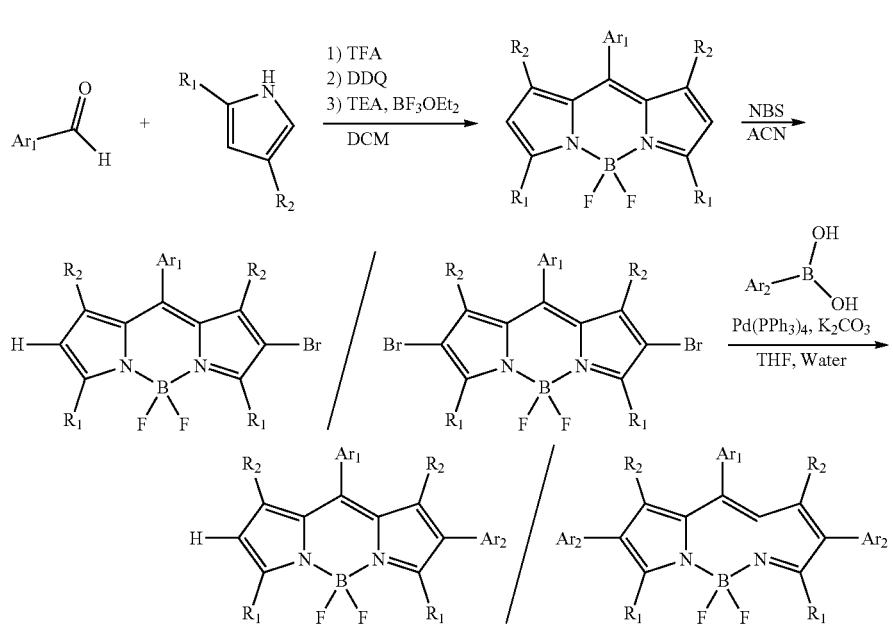

[Reaction Formula 3]

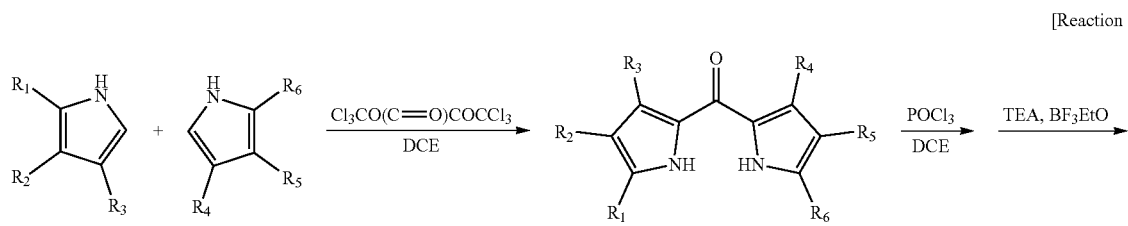

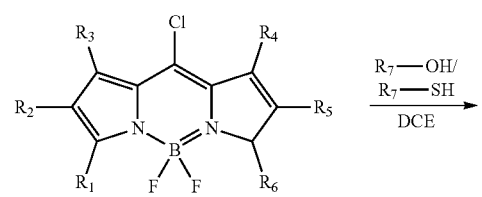

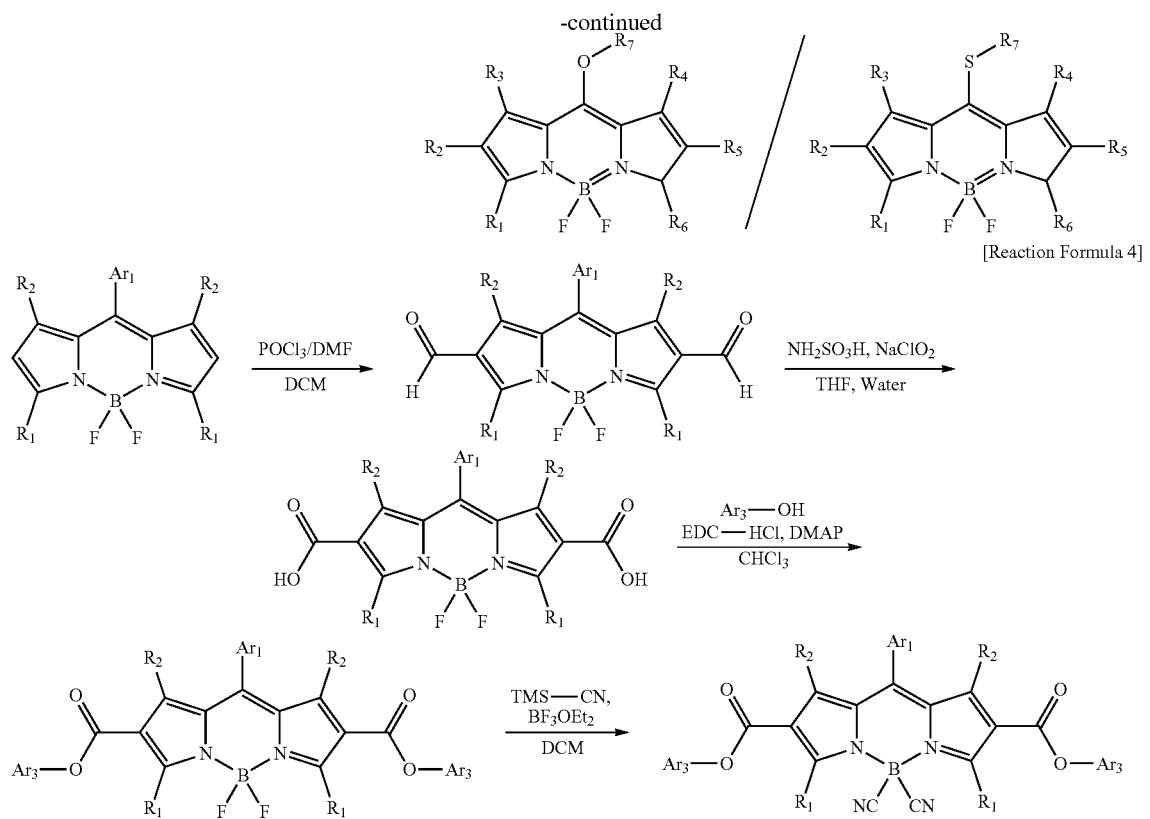
[Reaction Formula 4]
In Reaction Formulae 1 to 4,
R1 to R7, and Ar1 to Ar3 are the same as or different from each other, and each independently hydrogen; deuterium or a monovalent substituent.
Using Reaction Formulae 2 to 4, the following compounds A to N were synthesized.
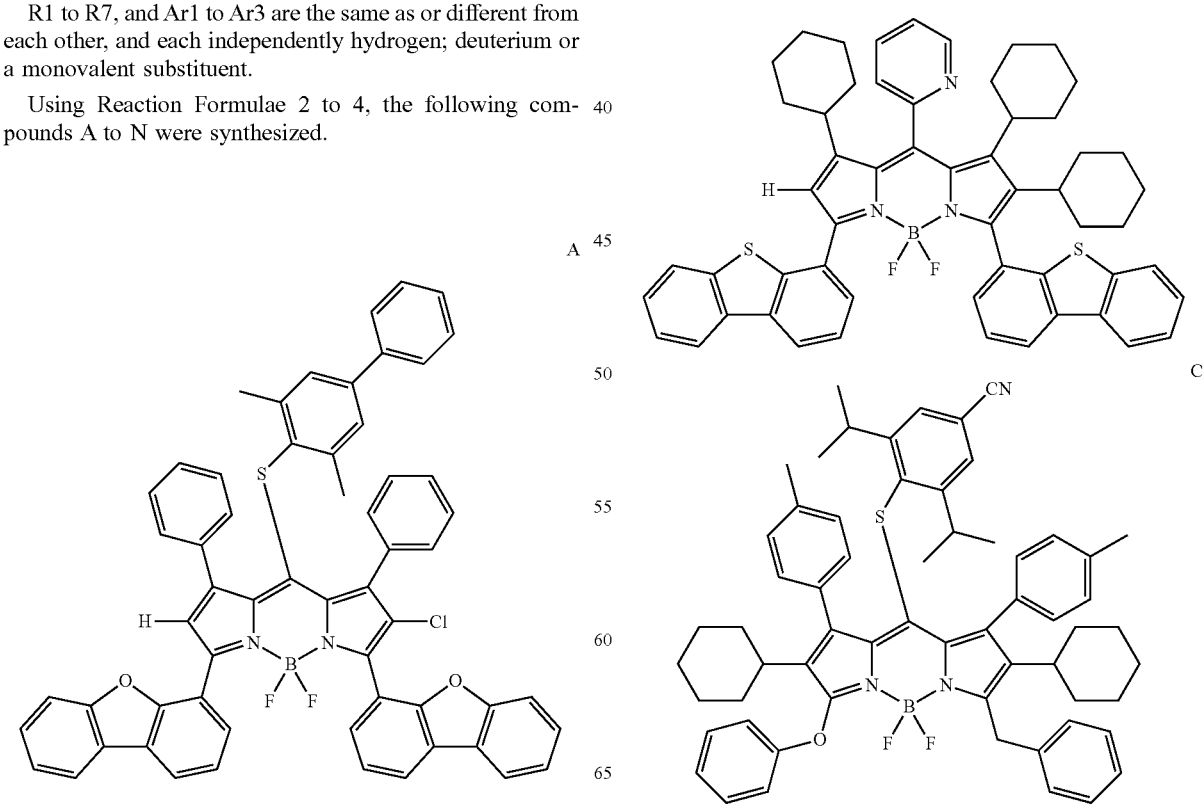

-continued
D
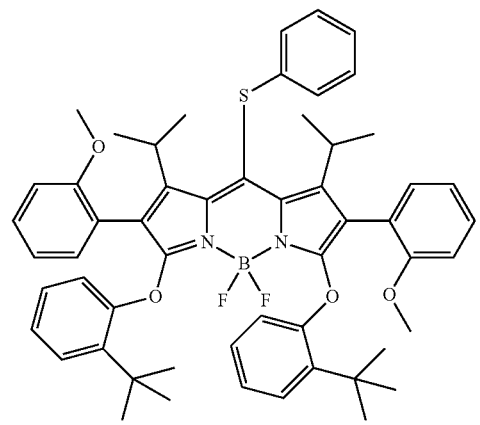
E
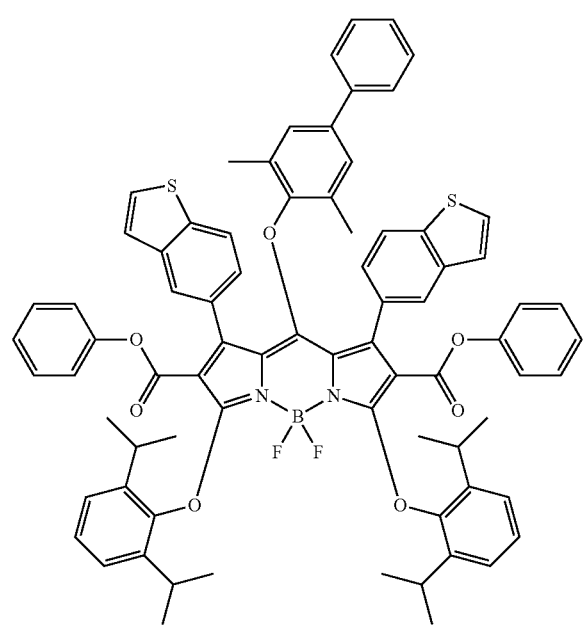
F
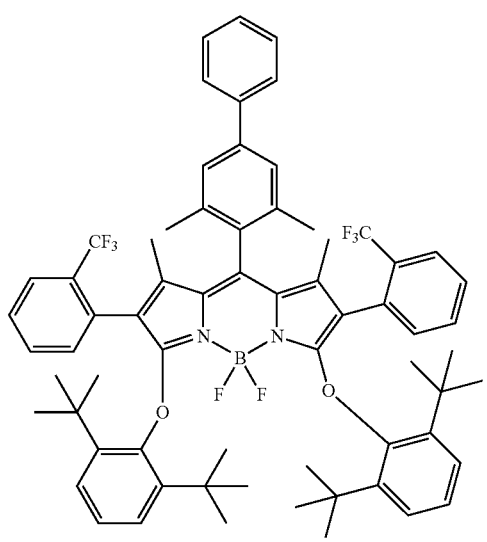
-continued
G
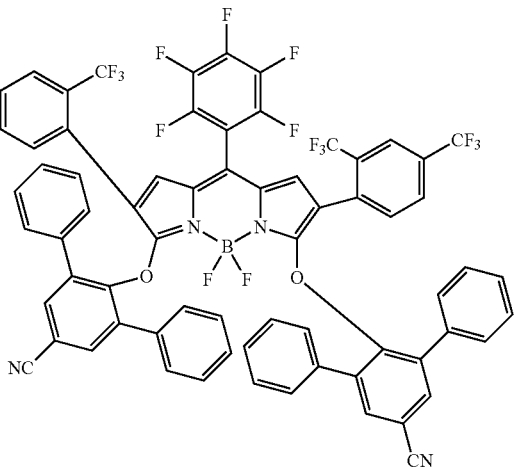
H
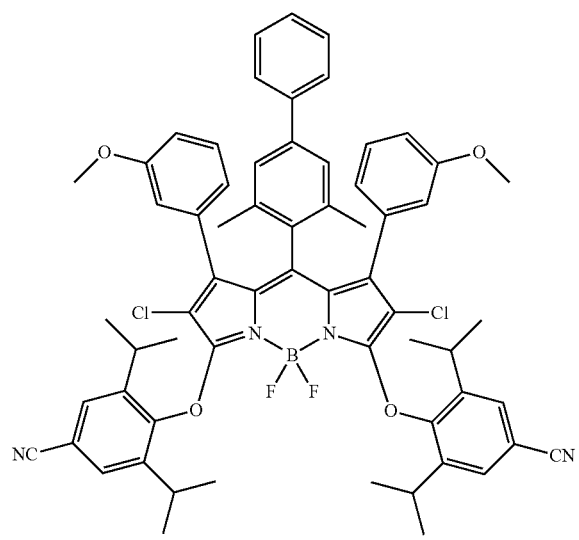
I
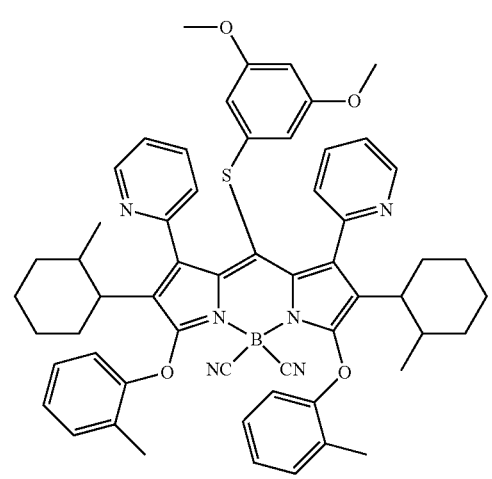

J

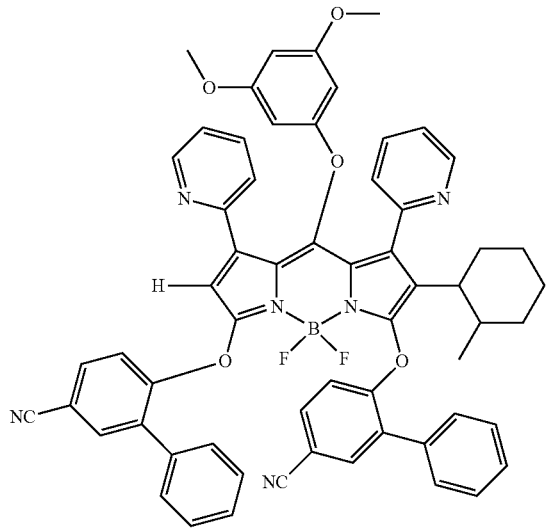

K

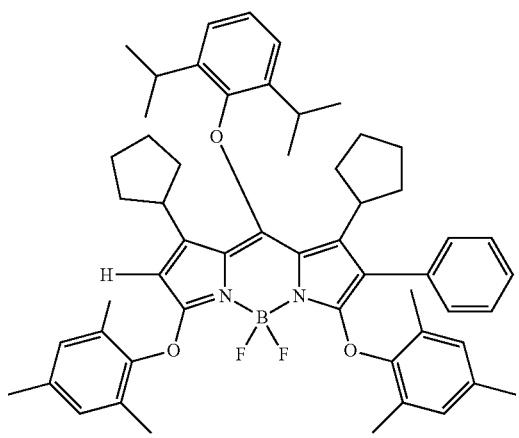

L

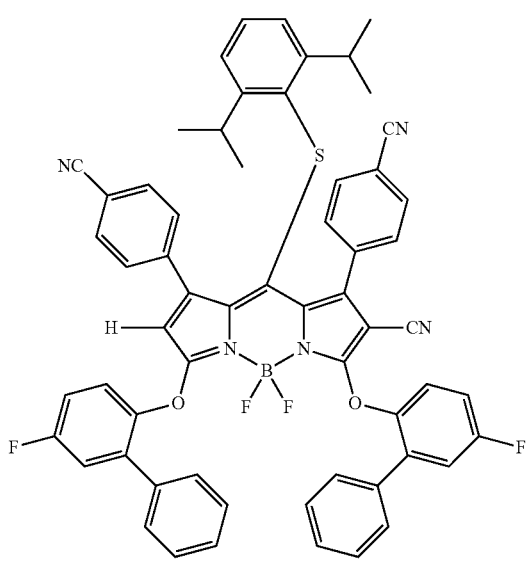

M

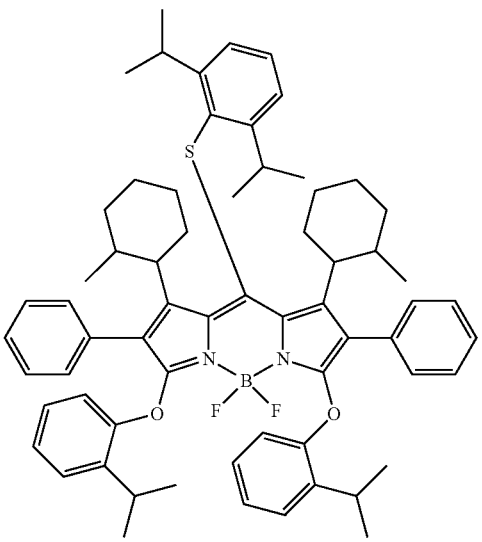

N

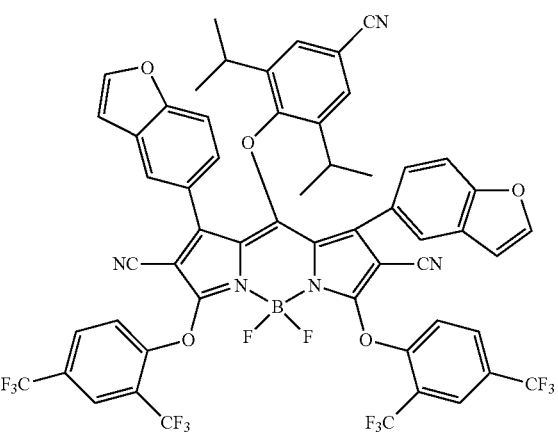

Mass analysis values for Compounds A to N are as follows.

Compound A
HR LC/MS/MS m/z calculated for $C_{59}H_{38}BClF_2N_2O_2S$ (M+): 922.2404; found: 922.2406.

Compound B
HR LC/MS/MS m/z calculated for $C_{56}H_{52}BF_2N_3S_2$ (M+): 879.3664; found: 879.3669.

Compound C
HR LC/MS/MS m/z calculated for $C_{62}H_{62}BN_5O_2S$ (M+): 951.4717; found: 951.4719.

Compound D
HR LC/MS/MS m/z calculated for $C_{55}H_{59}BF_2N_2O_4S$ (M+): 892.4257; found: 892.4260.

Compound E
HR LC/MS/MS m/z calculated for $C_{77}H_{67}BF_2N_2O_7S_2$ (M+): 1244.4451; found: 1244.4453.

Compound F
HR LC/MS/MS m/z calculated for $C_{67}H_{69}BF_8N_2O_2$ (M+): 1096.5324; found: 1096.5327.

Compound G
HR LC/MS/MS m/z calculated for $C_{69}H_{32}BF_{19}N_4O_2$ (M+): 1320.2315; found: 1320.2318.

Compound H
HR LC/MS/MS m/z calculated for $C_{63}H_{59}BCl_2F_2N_4O_4$ (M+): 1054.3974; found: 1054.3976.

Compound I

HR LC/MS/MS m/z calculated for $C_{57}H_{57}BN_6O_4S$ (M+): 932.4255; found: 932.4258.

Compound J

HR LC/MS/MS m/z calculated for $C_{60}H_{47}BF_2N_6O_5$ (M+): 980.3669; found: 980.3672.

Compound K

HR LC/MS/MS m/z calculated for $C_{55}H_{63}BF_2N_2O_3$ (M+): 848.4900; found: 848.4904.

Compound L

HR LC/MS/MS m/z calculated for $C_{60}H_{42}BF_4N_5O_2S$ (M+): 983.3088; found: 983.3090.

Compound M

HR LC/MS/MS m/z calculated for $C_{65}H_{75}BF_2N_2O_2S$ (M+): 996.5610; found: 996.5613.

Compound N

HR LC/MS/MS m/z calculated for $C_{56}H_{32}BF_{14}N_5O_5$ (M+): 1131.2273; found: 1131.2276.

Example 1

A first solution was prepared by dissolving A, an organic fluorescent substance, in an organic solvent (xylene).

A second solution was prepared by dissolving a thermoplastic resin SAN (styrene-acrylonitrile copolymer) in an organic solvent (xylene). The first solution and the second solution were homogeneously mixed so that the amount of the organic fluorescent substance was 0.5 parts by weight based on 100 parts by weight of the SAN. The solid content in the mixture solution was 20% by weight and viscosity was 200 cps. This solution was coated on a PET substrate, and the result was dried to prepare a color conversion film.

A luminance spectrum of the prepared color conversion film was measured using a spectroradiometer (SR series of TOPCON Corporation). Specifically, the prepared color conversion film was laminated on one surface of a light guide plate of a backlight unit including an LED blue backlight (maximum light emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without the color conversion film.

Example 2

An experiment was performed in the same manner as in Example 1 except that Compound B was used instead of Compound A.

Example 3

An experiment was performed in the same manner as in Example 1 except that Compound C was used instead of Compound A.

Example 4

An experiment was performed in the same manner as in Example 1 except that Compound D was used instead of Compound A.

Example 5

An experiment was performed in the same manner as in Example 1 except that Compound E was used instead of Compound A.

Example 6

An experiment was performed in the same manner as in Example 1 except that Compound F was used instead of Compound A.

Example 7

An experiment was performed in the same manner as in Example 1 except that Compound G was used instead of Compound A.

Example 8

An experiment was performed in the same manner as in Example 1 except that Compound H was used instead of Compound A.

Example 9

An experiment was performed in the same manner as in Example 1 except that Compound I was used instead of Compound A.

Example 10

An experiment was performed in the same manner as in Example 1 except that Compound J was used instead of Compound A.

Example 11

An experiment was performed in the same manner as in Example 1 except that Compound K was used instead of Compound A.

Example 12

An experiment was performed in the same manner as in Example 1 except that Compound L was used instead of Compound A.

Example 13

An experiment was performed in the same manner as in Example 1 except that Compound M was used instead of Compound A.

Example 14

An experiment was performed in the same manner as in Example 1 except that Compound N was used instead of Compound A.

Comparative Example 1

An experiment was performed in the same manner as in Example 1 except that BODIPY was used instead of Compound A.

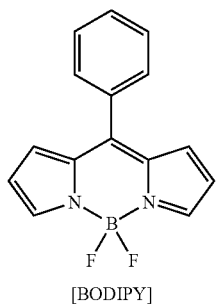

[BODIPY]

Comparative Example 2

An experiment was performed in the same manner as in Example 1 except that M-BODIPY was used instead of Compound A.

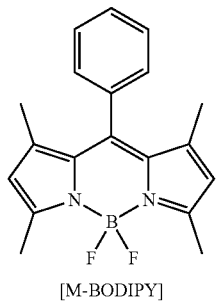

[M-BODIPY]

Comparative Example 3

An experiment was performed in the same manner as in Example 1 except that PhO-BODIPY was used instead of Compound A.

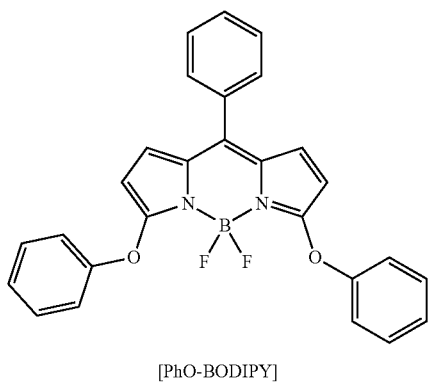

[PhO-BODIPY]

Experimental Example

For Examples 1 to 14 and Comparative Examples 1 to 3, physical properties and structure openness for a boron atom were measured, and the results are shown in Table 1.

Abs and PL of the solution respectively mean a maximum absorption wavelength and a maximum light emission wavelength, and after preparing each of the compounds in a certain toluene solution in a 0.01 mM concentration, UV was measured using mega-2100 (scinco Co., Ltd.), and PL was measured using FS-2 (scinco Co., Ltd.).

In addition, PL in the film was measured using mega-2100 (scinco Co., Ltd.) and FS-2 (scinco Co., Ltd.) for the manufactured film.

$\Delta PL$ is a value obtained by, based on PL of the manufactured film, irradiating an LED light source for 1,000 hours on the corresponding film, measuring PL again, and calculating a difference in the intensity from the initial value.

TABLE 1

| | | Solution | | Film | | $\Delta PL$ |
|---|---|---|---|---|---|---|
| | Compound | Abs. | PL | PL | Openness | @1000 h |
| Example 1 | A | 583 | 621 | 634 | 0.11 | 90.80% |
| Example 2 | B | 546 | 583 | 598 | 0.13 | 89.60% |
| Example 3 | C | 591 | 622 | 635 | 0.42 | 82.30% |
| Example 4 | D | 587 | 620 | 633 | 0.15 | 87.90% |
| Example 5 | E | 507 | 531 | 549 | 0.04 | 95.70% |
| Example 6 | F | 522 | 540 | 558 | 0.02 | 96.40% |
| Example 7 | G | 511 | 525 | 540 | 0.06 | 95.10% |
| Example 8 | H | 515 | 534 | 550 | 0.04 | 95.80% |
| Example 9 | I | 580 | 623 | 640 | 0.32 | 83.80% |
| Example 10 | J | 511 | 529 | 541 | 0.36 | 83.10% |
| Example 11 | K | 505 | 523 | 537 | 0.14 | 89.10% |
| Example 12 | L | 601 | 628 | 642 | 0.39 | 82.50% |
| Example 13 | M | 579 | 593 | 615 | 0.25 | 85.40% |
| Example 14 | N | 501 | 522 | 542 | 0.37 | 82.70% |
| Comparative Example 1 | BODIPY | 500 | 522 | 543 | 2.51 | 17.60% |
| Comparative Example 2 | M-BODIPY | 502 | 525 | 544 | 0.87 | 29.10% |
| Comparative Example 3 | PhO-BODIPY | 513 | 528 | 540 | 0.85 | 49.30% |

It was identified that Examples 1 to 14 using the compounds having structure openness for a boron atom of 0.5 or less as a color conversion film had a $\Delta PL$ value of 50% or greater, and it was identified that, even with the BODIPY compounds, Comparative Examples 1 to 3 using the compounds having structure openness for a boron atom of greater than 0.5 had a $\Delta PL$ value of 50% or less, and Comparative Example 1 having the highest structure openness for a boron atom had a significantly low $\Delta PL$ value. Accordingly, when satisfying the structure openness for a boron atom of the present disclosure, light emission efficiency was high and stability was superior.

The invention claimed is:

1. A compound having structure openness for a boron atom of 0.5 or less as measured using a probe having a radius of 1.6 Å, wherein the compound has a structural formula selected from the following structural formulae:

A
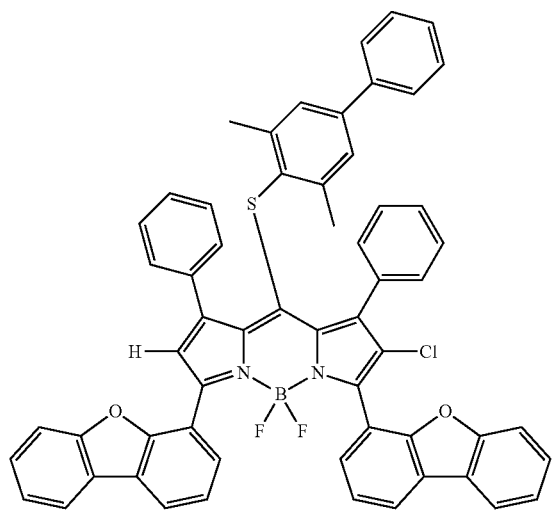
B
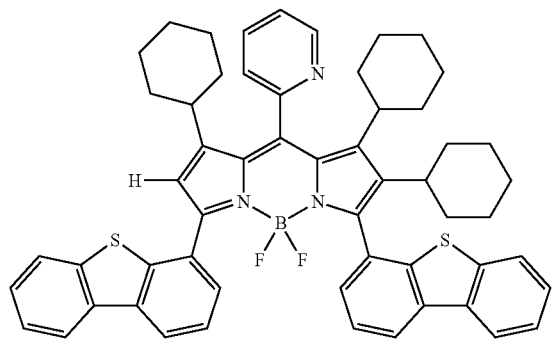
C
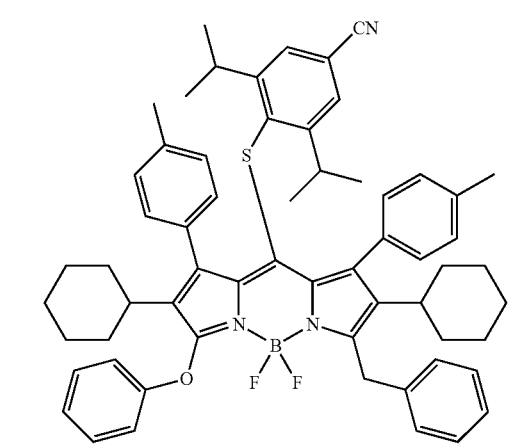
D
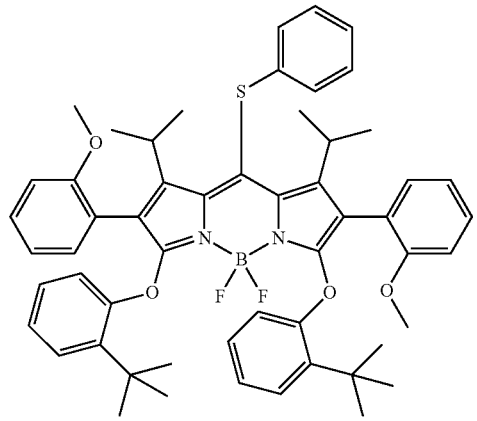
E
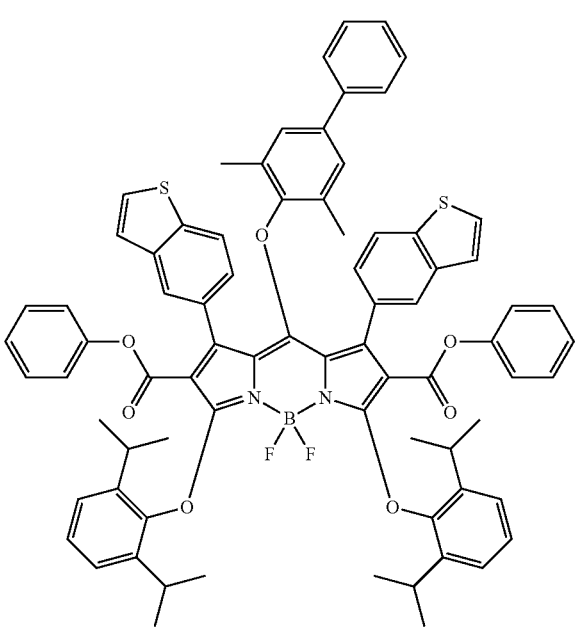
F

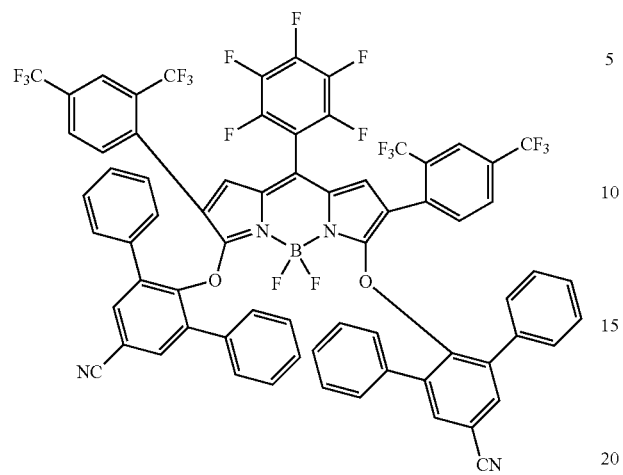
G
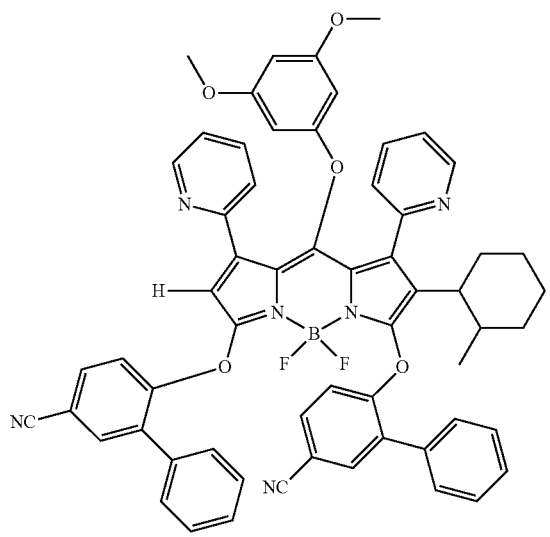
J
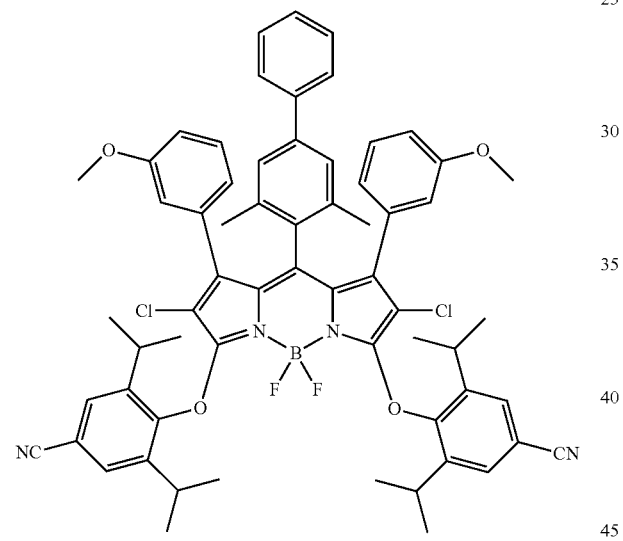
H
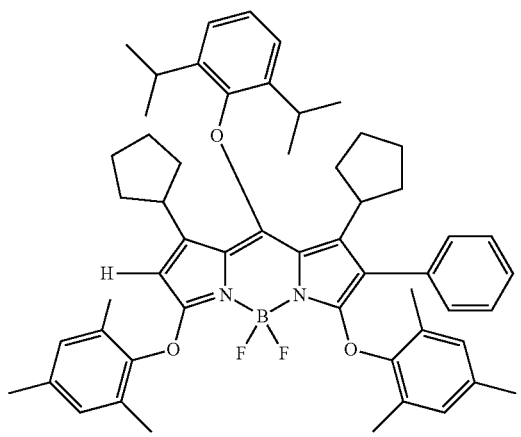
K
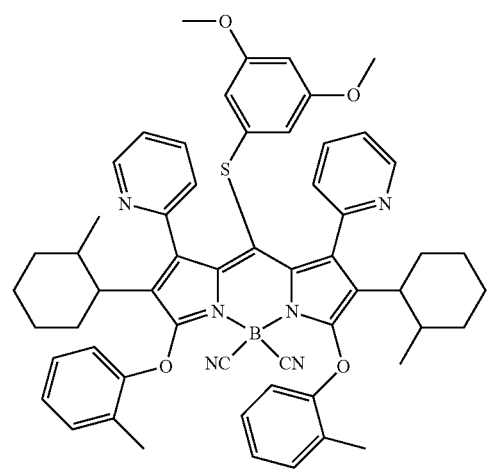
I
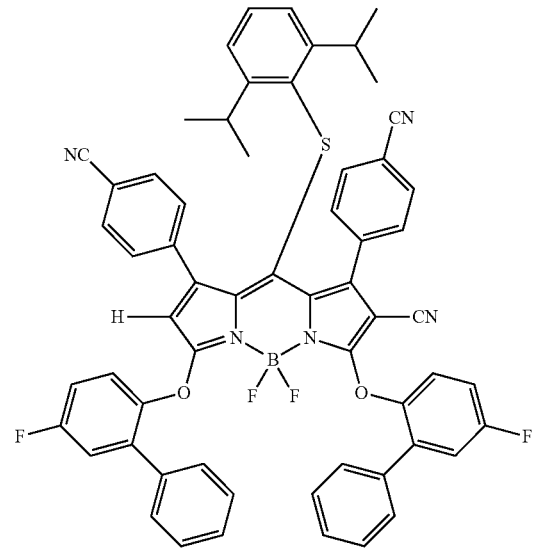
L

-continued

M

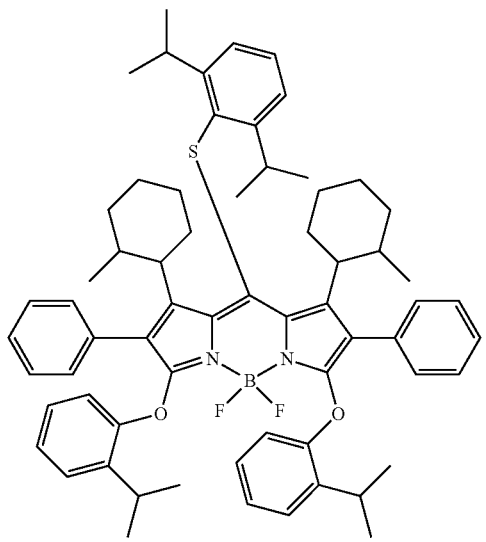

N

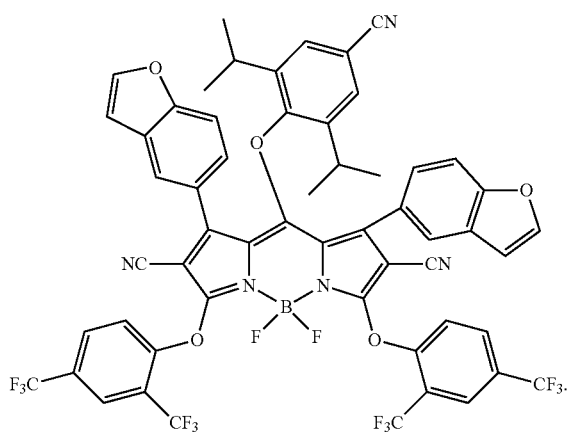

2. A color conversion composition comprising the compound of claim 1.

3. The color conversion composition of claim 2, further comprising a resin matrix material, wherein the compound is dispersed in the resin matrix material.

4. The color conversion composition of claim 3, the resin matrix material is a thermoplastic polymer or a thermocurable polymer.

5. The color conversion composition of claim 3, the resin matrix material is at least one selected from the group of a poly(meth)acryl-based, a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, and a modified polyvinylidene fluoride (modified-PVDF)-based resins.

6. The color conversion composition of claim 2, comprising the compound in 0.001% by weight to 20% by weight with respect to 100 parts by weight of the color conversion composition.

7. The color conversion composition of claim 2, which has viscosity of 200 cps to 2,000 cps at room temperature.

8. A color conversion film comprising:
a resin matrix; and the compound of claim 1 dispersed in the resin matrix.

9. The color conversion film of claim 8, wherein a content of the compound is from 0.001% by weight to 10% by weight with respect to 100 parts by weight of the color conversion film.

10. The color conversion film of claim 8, wherein the film has a thickness of 2 μm to 200 μm.

11. A method for manufacturing a color conversion film, the method comprising:
measuring structure openness of compounds including a boron atom;
selecting a compound having the structure openness for a boron atom of 0.5 or less;
dissolving the compound selected in an organic solvent;
coating the solution on a substrate; and
drying the solution-coated substrate, wherein the compound has a structural formula selected from the following structural formulae:

A

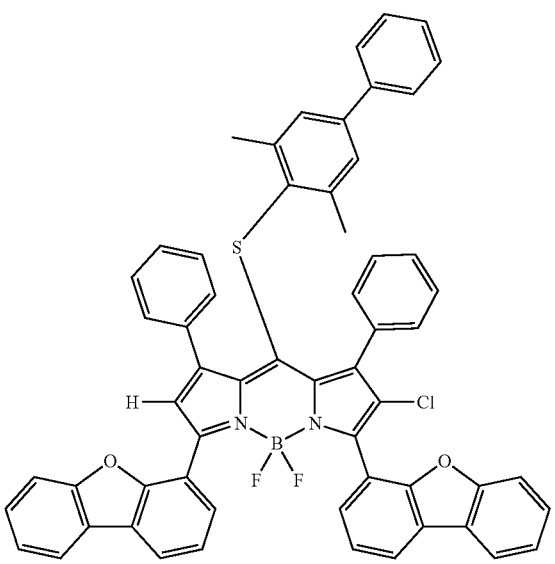

B

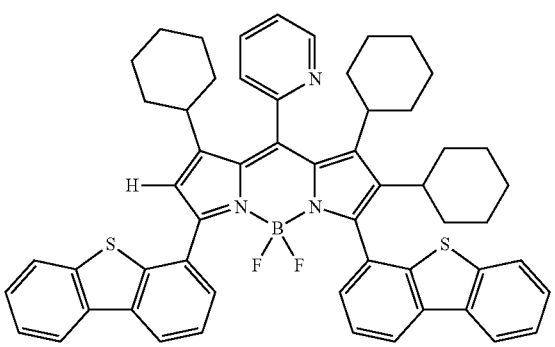

C
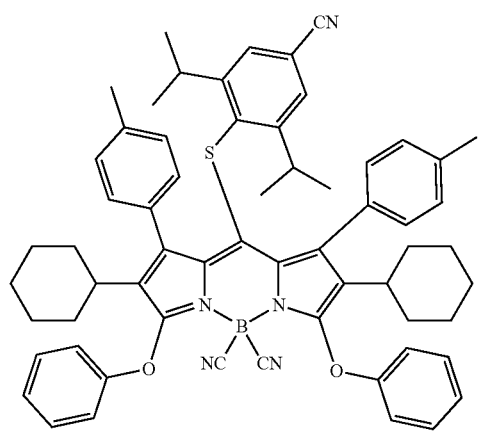
D
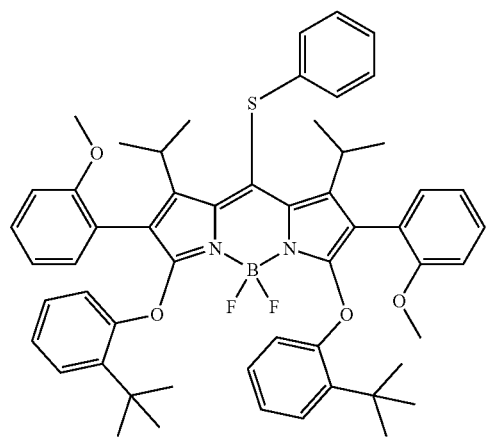
E
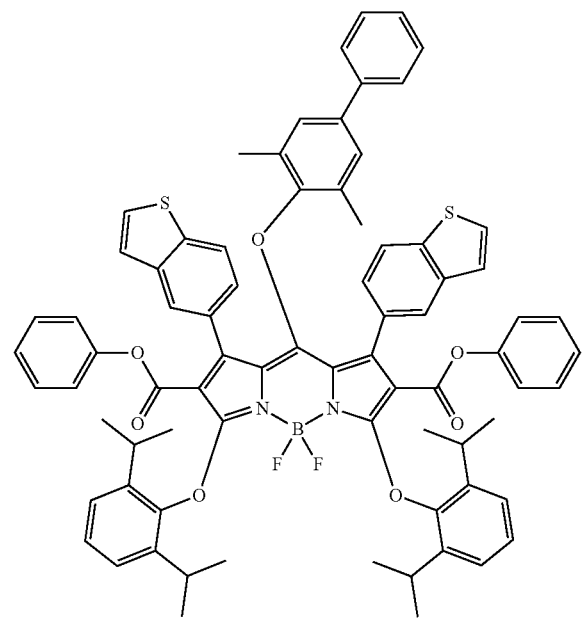
F
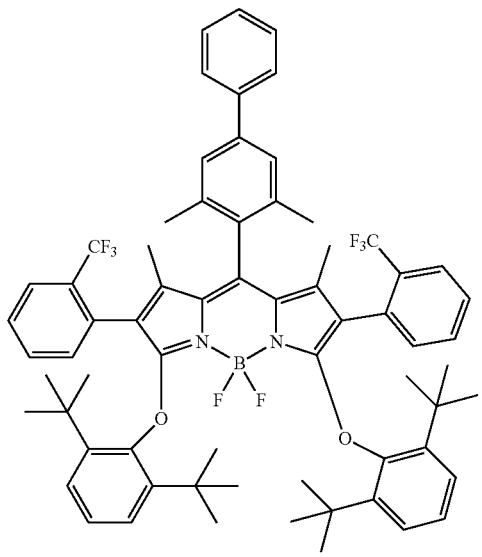
G
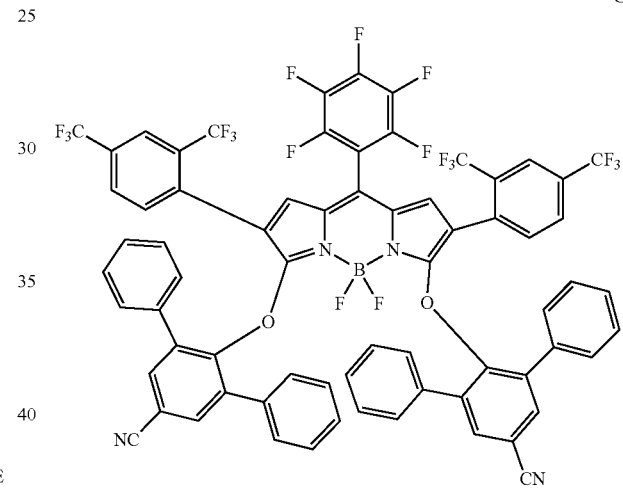
H
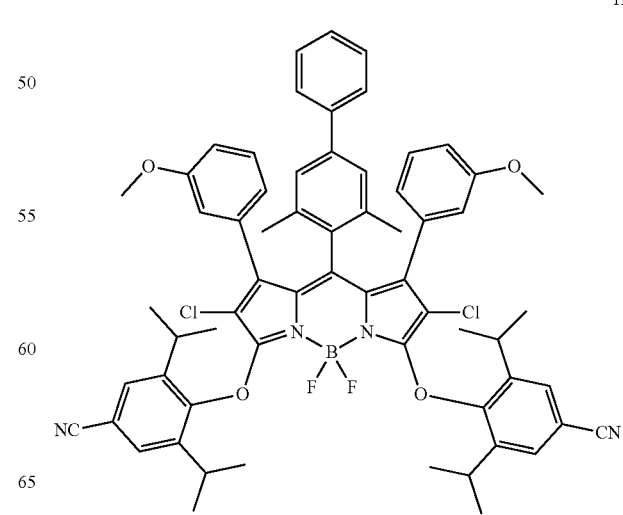

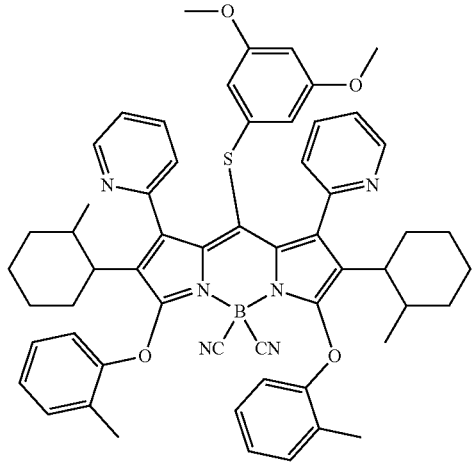
I
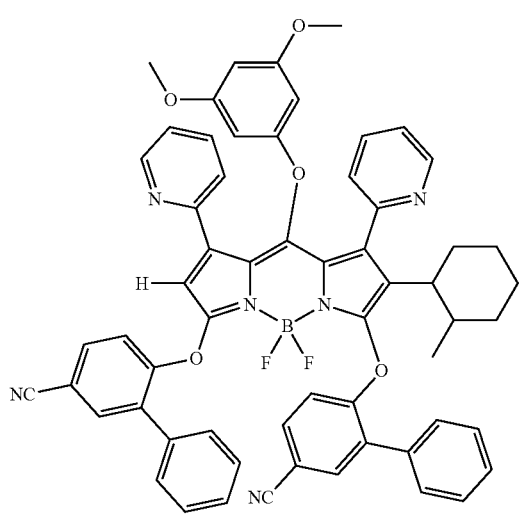
J
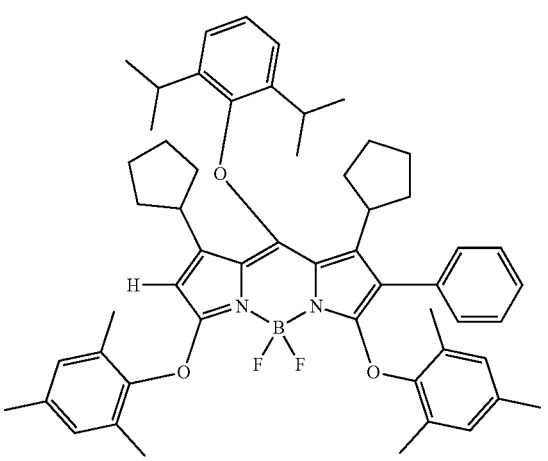
K
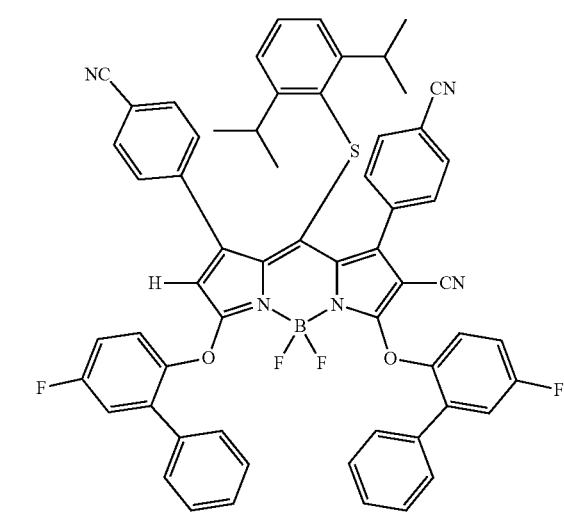
L
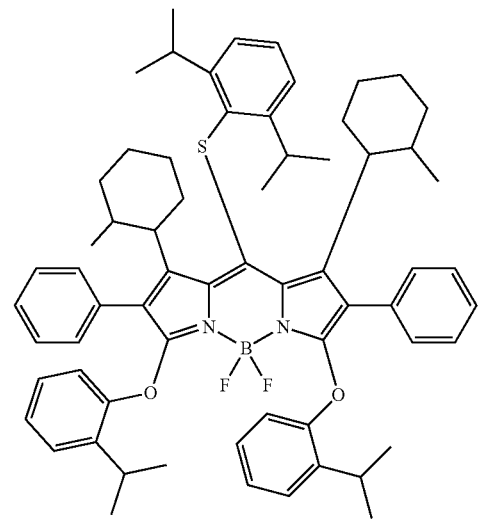
M
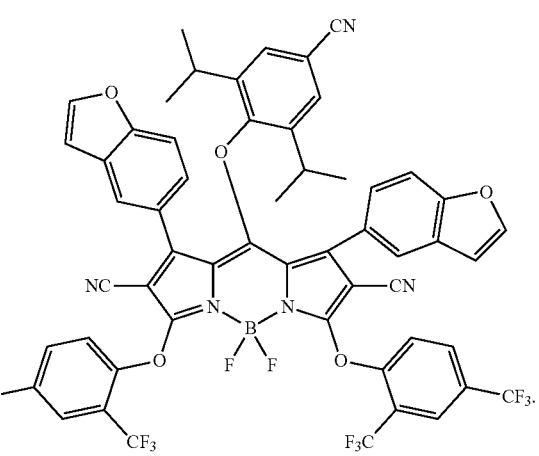
N
12. The method for manufacturing a color conversion film of claim 11, wherein the measuring of structure openness of compounds including a boron atom is measuring structure openness using a probe having a radius of 1.6 Å.
13. The method for manufacturing a color conversion film of claim 11, the method further comprising:

dissolving a resin matrix material in a second organic solvent, and after the dissolving of the compound in an organic solvent, mixing the compound-dissolved organic solvent and the second organic solvent.

* * * * *